J. F. O'CONNOR.
FRICTION SHOCK ABSORBING MECHANISM.
APPLICATION FILED JULY 12, 1920.
1,405,620.
Patented Feb. 7, 1922.
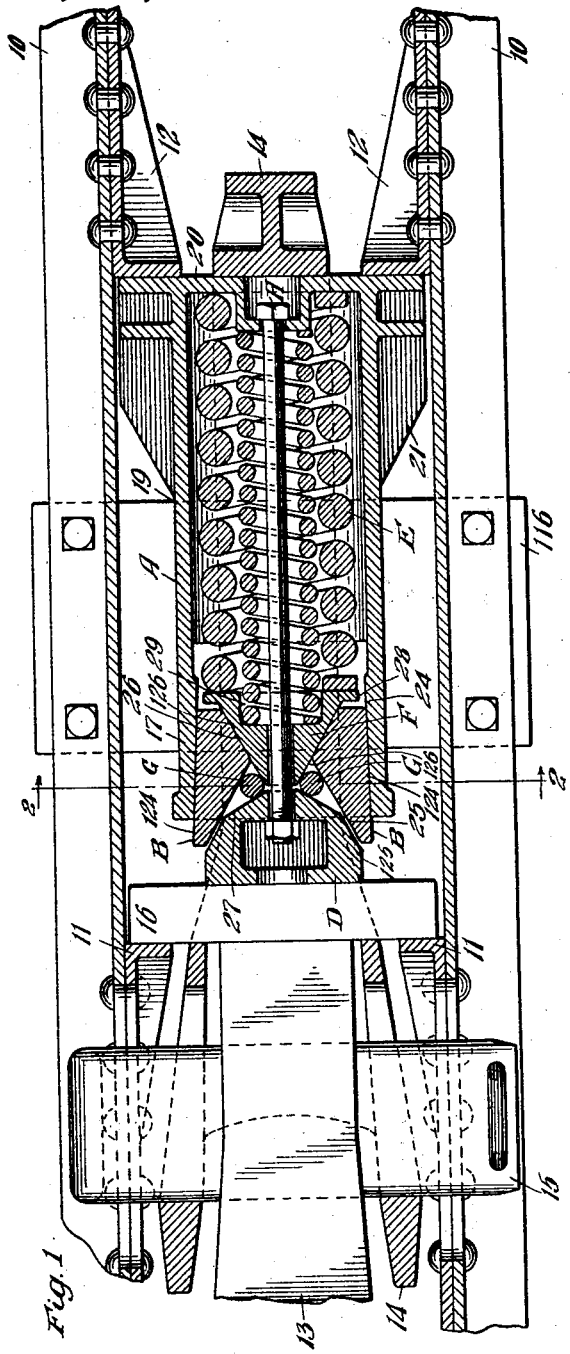
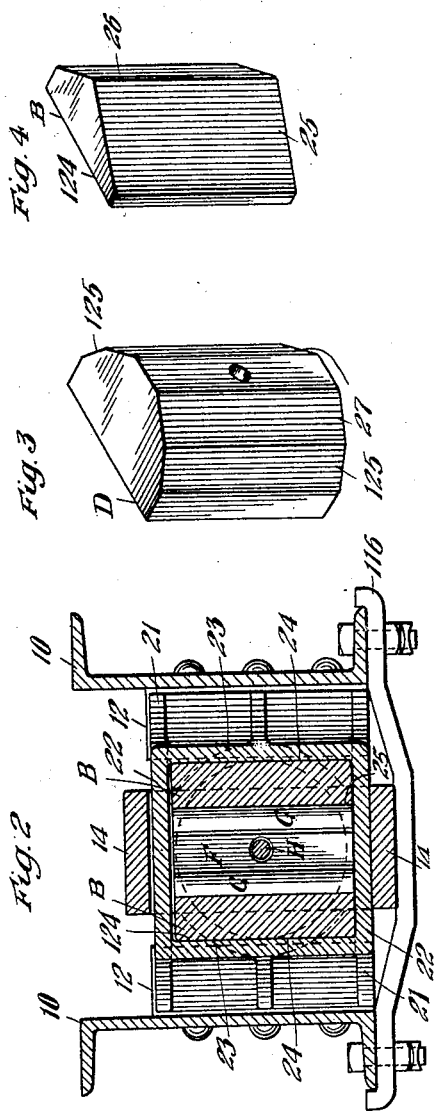
Witnesses
Wm. Geiger
Inventor
John F. O'Connor
By Geo. I. Haight
His Atty.

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,405,620.  Specification of Letters Patent.  Patented Feb. 7, 1922.

Application filed July 12, 1920. Serial No. 395,458.

*To all whom it may concern:*

Be it known that I, JOHN F. O'CONNOR, a citizen of United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The object of the invention is to provide a friction shock absorbing mechanism of high capacity, certain release, and efficient operation.

In the drawing forming a part of this specification, Figure 1 is a horizontal longitudinal sectional view of a portion of a railway draft rigging showing my improvements in connection therewith. Figure 2 is a vertical transverse sectional view taken substantially on the line 2—2 of Figure 1. And Figures 3 and 4 are detail perspectives of the wedge and one of the friction shoes, respectively.

In said drawing, 10—10 denote channel shaped center or draft sills of a railway car to the inner faces of which are secured front stop lugs 11 and rear stop lugs 12. A portion of a drawbar is indicated at 13 to which is connected a hooded cast yoke 14 by a coupler key 15. Within the yoke is disposed the shock absorbing mechanism proper, hereinafter described, and a front follower 16. The yoke and movable parts associated therewith are supported by a detachable saddle plate 116.

The improved shock absorber mechanism, as shown, comprises, broadly, a combined friction shell and spring cage casting A; a pair of friction shoes B—B; a wedge D; a spring E; a spring follower F; antifriction rollers G—G; and a retainer bolt H.

The friction shell proper, 17, is formed at the forward end of the casting A and the spring cage 19 rearwardly thereof, the latter having an integral rear wall 20 adapted to act as the rear follower of the mechanism, the rear wall 20 being laterally extended and suitably braced by ribs and flanges 21—21. The shell 17, is of substantially square, boxlike form, the shell having upper and lower walls 22—22 and side walls 23—23. The latter are provided on their inner sides with friction faces 24—24, the same being slightly inwardly converged as shown in Figure 1.

The friction shoes B are of like construction and each is formed on its outer side with a flat friction face 124 adapted to cooperate with a corresponding friction face 24. On its inner side, each shoe is formed with a wedge face 25 extending at a relatively acute angle with respect to the axis of the shell. Near its rear end, each shoe B is formed with a beveled or inclined face 26.

The wedge D preferably consists of a casting, suitably cored, and is provided on opposite sides thereof with wedge faces 125—125 and rearwardly of the latter with other inclined faces 27—27. The wedge faces 125 extend at the same relatively acute angle with respect to the axis of the mechanism as do the wedge faces 25 on the shoes. The faces 27 of the wedge D extend at a comparatively blunt angle as clearly indicated in Figure 1, for the purpose hereinafter described.

The follower F is provided with flanges 28 against which bear the outer heavy coil of the spring E and is suitably recessed as indicated at 29 to receive the inner lighter coil of the spring. On its forward side, the follower F is provided with a pair of flat faces 126—126 which normally engage with the inclined faces 26 of the shoes but are of greater length than the latter and project forwardly of the faces 26 of the shoes, as clearly indicated in Figure 1. With the construction described, it is evident that two spaces, one on each side of the axis of the shell, are provided, the same being of generally triangular outline and within which are accommodated the rollers G. Each roller G has contact with a wedge face 25 of a shoe, with a face 27 of the wedge D, and with a face 126 of the follower F.

The retainer bolt H passes through suitably alined perforations in the wedge D, follower F, and rear wall 20 of the casting A and through the center of the spring. The function of the bolt H is primarily to hold the parts in assembled relation and also, when desired, to hold the spring under an initial compression.

The operation is as follows. As clearly indicated in Figure 1, the wedge faces 125 of the wedge D are normally out of contact or at least have non-wedge-acting engagement with the wedge faces 25 of the shoes which will be the condition assumed when the follower F is in snug engagement with the shoes. As actuating pressure is applied substantially parallel to the axis of the shell, as for instance in a buffing movement of the drawbar, the wedge D will be forced rearwardly relatively to the shell A. During the initial portion of the compressive stroke, the wedge D will cause the rollers G to roll along the wedge faces 25 of the shoes B thereby forcing the follower F rearwardly in advance of the shoes B and effecting disengagement of the follower F from the shoes B. This action continues until the wedge D comes into operative wedging engagement with the shoes B. During the action of the rollers G above described, the rollers will slide on the inclined faces 126 of the follower F. Inasmuch as the only resistance afforded by the follower F is that corresponding to the initial compression of the spring, no appreciable wear will result to the rollers G. After the wedge D has been brought into operative engagement with the shoes B, a spreading action on the shoes is effected and this can be made as great as desired by making the angles of the faces 25 and 125 unusually acute with respect to the axis of the shell. During the remainder of the compressive action, the wedge D and shoes B will travel inwardly of the shell in the usual manner, the total resistance of the mechanism being that of the friction generated between the shoes and the shell plus the spring resistance. At the end of the compressive stroke and upon removal of the actuating pressure, the spring will react through the follower F which will cause the rollers G to roll on the sets of faces 25 and 126 and inasmuch as the rollers engage the relatively blunt angled faces 27 of the wedge D, the latter will be pressed out from active wedging engagement with the shoes B, thereby permitting the friction element to collapse and the parts to return to normal position. During the compressive stroke, the wedging action exerted against the shoes B will cause expansion of the friction shell and, in actual practice, the taper of the shell or convergence of the surfaces 24 will preferably be made such that the taper will be taken out during the compressive stroke so as to leave, in effect, a friction shell having substantially truly parallel friction surfaces. In the release, the shell will contract to its normal position which will produce, in effect, a swinging of the inner ends of the shoes toward each other which will augment the release action effected by the follower F, heretofore described and assist in squeezing or forcing out the wedge D from between the outer ends of the shoes B.

I have herein shown and described what I now consider the preferred manner of carrying out the invention but the same is merely illustrative and not by way of limitation. All changes and modifications are contemplated that come within the scope of the claims appended hereto.

I claim:

1. In a friction shock absorbing mechanism, the combination with a friction shell; of friction shoes cooperable therewith and having inner faces at a wedge-acting angle with respect to the axis of the shell; a spring resistance; a spring follower at the end of the spring resistance adjacent the shoes; a pressure-transmitting block having faces at an angle the same as those of said shoes but normally in non-wedge-acting relation thereto; and anti-friction elements, each interposed betwen and engaging a shoe, the block, and the follower, said anti-friction elements being adapted to roll relatively to the shoes to thereby advance the follower relatively to the shoes and permit said faces of the block and shoes to come into active wedging engagement during the compressive action.

2. In a friction shock absorbing mechanism, the combination with a friction shell having interior friction surfaces inwardly slightly converged; of friction shoes cooperable with said surfaces, each shoe having a wedge face on its inner side extending at a relatively acute angle with respect to the axis of the shell; a spring resistance; a follower at the end of the spring adjacent the shoes and extending between the latter; an outer wedge block having wedge faces corresponding in number with and disposed opposite said wedge faces of the shoes but normally slightly spaced therefrom; and anti-friction elements corresponding in number to the number of shoes, each anti-friction element being interposed between and engaging a friction shoe, the wedge block and the follower, said anti-friction elements being arranged to roll relatively to the shoes when actuating pressure is applied to the wedge block to thereby force said follower in advance of the shoes and permit the wedge block to come into active wedging engagement with the shoes.

3. In a friction shock absorbing mechanism, the combination with a friction shell having interior friction surfaces; of friction shoes cooperable with said shell, each shoe having a wedge face on its inner side extending at a relatively acute angle with respect to the axis of the shell; a spring resistance; a spring follower at the end of the spring resistance adjacent the shoes, said follower having faces inclined in the opposite direction to those of the shoes and extending beyond the latter outwardly toward the end of the shell; a wedge block having wedge faces corresponding to said wedge faces of the shoes and normally in non-wedge-acting relation thereto, said wedge block having also additional faces near the inner end thereof inclined at a relatively blunt angle with respect to the axis of the shell; and anti-friction elements, each anti-friction element being in engagement with the wedge face of the shoe, one of said inclined faces of the follower, and one of said blunt-angled faces of the wedge block.

4. In a friction shock absorbing mechanism, the combination with a friction shell having interior friction surfaces; of friction shoes cooperable with said shell, each shoe having a wedge face on its inner side extending at a relatively acute angle with respect to the axis of the shell; a spring resistance, a spring follower at the end of the spring resistance adjacent the shoes, said follower having faces inclined in the opposite direction to those of the shoes and extending beyond the latter outwardly toward the end of the shell; a wedge block having wedge faces corresponding to said wedge faces of the shoes and normally in non-wedge-acting relation thereto; said wedge block having also additional faces near the inner end thereof inclined at a relatively blunt angle with respect to the axis of the shell; and anti-friction elements, each anti-friction element being in engagement with the wedge face of a shoe, one of said inclined faces of the follower, and one of said blunt-angled faces of the wedge block, said shoes having inclined faces at their inner ends corresponding to said inclined faces of the follower and normally in engagement with the latter.

5. In a friction shock absorbing mechanism, the combination with a casting having a friction shell at one end thereof and a spring cage integrally formed therewith, the interior of the shell being provided with longitudinally extending flat friction surfaces slightly inwardly converged; of a spring within the spring cage; friction shoes cooperable with the friction surfaces of the shell, each shoe having a wedge face extending from its outer end inwardly of the shell at a relatively acute angle with respect to the axis of the shell and an oppositely inclined face at its inner end; a follower interposed between the spring and the shoes and having outwardly converging faces on its outer side and normally engaging said inclined faces at the inner ends of the shoes and extending forwardly of the latter; a wedge block having wedge faces corresponding to said wedge faces of the shoes and normally in non-wedge-acting relation thereto, said wedge block having also additional faces near its inner end inclined at a relatively blunt angle with respect to the axis of the shell; and anti-friction elements, each anti-friction element being disposed in the space defined by the wedge face of a friction shoe, an inclined face of the follower, and a blunt angled face of the wedge block.

6. In a friction shock absorbing mechanism, the combination with a friction shell having interior friction surfaces; of friction-shoes cooperable with said surfaces, each shoe having a wedge face on its inner side extending at a relatively acute angle with respect to the axis of the shell; a spring resistance; an outer wedge block having wedge faces corresponding in number with and disposed opposite said wedge faces of the shoes but normally in non-wedge-acting relation thereto; an element having outwardly converging faces extending between the friction-shoes and to points forwardly of the inner ends of said wedge faces of the shoes; and anti-friction rollers, corresponding in number to the number of shoes, each interposed between and engaging a friction-shoe, the wedge block and said element, said rollers being arranged to roll on the shoes when actuating pressure is applied to the wedge block and thereby allow said wedge block to have wedging relation with said shoes.

In witness that I claim the foregoing I have hereunto subscribed my name this 25th day of June, 1920.

JOHN F. O'CONNOR.

Witnesses:
META SCHMIDT,
UNA C. GRIGSBY.